(12) United States Patent
Ayzenberg et al.

(10) Patent No.: US 10,101,943 B1
(45) Date of Patent: Oct. 16, 2018

(54) REALIGNING DATA IN REPLICATION SYSTEM

(71) Applicant: EMC Corporation, Hopkinton, MA (US)

(72) Inventors: Lev Ayzenberg, Petah Tikva (IL); Assaf Natanzon, Tel Aviv (IL); Erez Sharvit, Ramat Gan (IL); Yoval Nir, Lehavim (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 109 days.

(21) Appl. No.: 14/496,795

(22) Filed: Sep. 25, 2014

(51) Int. Cl.
*G06F 3/06* (2006.01)
*G06F 12/02* (2006.01)

(52) U.S. Cl.
CPC .......... *G06F 3/0656* (2013.01); *G06F 3/0619* (2013.01); *G06F 3/0665* (2013.01); *G06F 3/0689* (2013.01); *G06F 12/0246* (2013.01); *G06F 2003/0691* (2013.01); *G06F 2212/262* (2013.01); *G06F 2212/7203* (2013.01)

(58) Field of Classification Search
CPC ...... G06F 3/061–3/0613; G06F 3/0656; G06F 3/0619; G06F 12/0246; G06F 13/1673; G06F 2003/0691; G06F 2205/062
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,546,347 A | 8/1996 | Ko et al. |
| 5,864,837 A | 1/1999 | Maimone |
| 5,990,899 A | 1/1999 | Whitten |
| 5,879,459 A | 3/1999 | Gadgil et al. |
| 5,982,772 A | 11/1999 | Oskouy |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,151,658 A * | 11/2000 | Magro ................ G06F 13/1673 711/110 |
| 6,174,377 B1 | 1/2001 | Doering et al. |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; p. 1.

(Continued)

*Primary Examiner* — Nicholas Simonetti
(74) *Attorney, Agent, or Firm* — Daly, Crowley Mofford & Durkee, LLP

(57) ABSTRACT

In one aspect, a method includes making a first active buffer a passive buffer, generating a second active buffer to receive new I/Os, making a list of locations that need realignment in the passive buffer, flushing open I/Os at a splitter, reading I/Os which need realignment, discarding re-aligned I/Os for overwritten areas and sending the passive buffer to a replica site.

17 Claims, 7 Drawing Sheets

(56) References Cited

U.S. PATENT DOCUMENTS

| | | |
|---|---|---|
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,051,126 B1 | 3/2006 | Franklin |
| 7,043,610 B2 | 5/2006 | Horn et al. |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,737 B1 | 10/2006 | Thelin |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leveret |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Hellen et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,838 B1 * | 11/2013 | Marshak ............ G06F 3/061 710/16 |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |

(56) References Cited

U.S. PATENT DOCUMENTS

| | | |
|---|---|---|
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2006/0212462 A1 | 9/2006 | Hellen et al. |
| 2007/0055833 A1 | 3/2007 | Vu et al. |
| 2007/0162513 A1 | 7/2007 | Lewin et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1* | 9/2007 | Lewin .................. G06F 11/1471 714/6.32 |
| 2007/0266053 A1 | 11/2007 | Ahal et al. |
| 2008/0082591 A1 | 4/2008 | Ahal et al. |
| 2008/0082592 A1 | 4/2008 | Ahal et al. |
| 2008/0082770 A1 | 4/2008 | Ahal et al. |
| 2009/0198893 A1 | 8/2009 | Sorgard et al. |
| 2011/0231596 A1 | 9/2011 | Goss et al. |
| 2012/0173773 A1 | 7/2012 | Povaliaev et al. |
| 2012/0317353 A1* | 12/2012 | Webman ................ G06F 3/065 711/108 |
| 2012/0324180 A1* | 12/2012 | Asnaashari ........... G06F 13/161 711/155 |
| 2013/0007381 A1* | 1/2013 | Palmer ................ G06F 12/0246 711/154 |
| 2013/0073784 A1* | 3/2013 | Ng ...................... G06F 12/0246 711/103 |
| 2014/0173186 A1* | 6/2014 | Randall ............... G06F 12/0866 711/103 |
| 2015/0121021 A1* | 4/2015 | Nakamura ............ G06F 3/0611 711/159 |
| 2016/0011996 A1* | 1/2016 | Asaad ..................... G06F 15/76 710/308 |
| 2016/0054942 A1* | 2/2016 | Yu ............................ G06F 1/30 714/718 |

OTHER PUBLICATIONS

Soules, "Metadata Efficiency in Versioning File Systems"; 2003; pp. 1-16.

AIX System Management Concepts: Operating Systems and Devices; May 2000; pp. 1-280.

Soules et al.; "Metadata Efficiency in a Comprehensive Versioning File System;" May 2002; CMU-CS-02-145; School of Computer Science, Carnegie Mellon University, Pittsburgh, PA 15213; 33 pages.

Linux Filesystems; Sams Publishing; 2002; pp. 17-22 and 67-71.

Bunyan, "Multiplexing in a BrightStor® ARCserve® Backup Release 11"; Mar. 2004; pp. 1-4.

Marks, "Network Computing;" Feb. 2, 2006; pp. 1-8.

Hill, "Network Computing," Jun. 8, 2006; pp. 1-9.

Microsoft Computer Dictionary; 2002; Press Fifth Edition; 2 pages.

Retrieved from http://en.wikipedia.org/wiki/DEFLATE; DEFLATE; Jun. 19, 2008; pp. 1-6.

Retrieved from http://en.wikipedia.org/wiki/Huffman coding; HUFFMAN CODING; Jun. 8, 2008; pp. 1-11.

Retrieved from http:///en.wikipedia.org/wiki/LZ77; LZ77 and LZ78; Jun. 17, 2008; pp. 1-2.

Yael Golan, et al.; "Backlogging I/O Metadata," U.S. Appl. No. 14/499,569, filed Sep. 29, 2014 31 pages.

U.S. Appl. No. 11/609,560 downloaded Jan. 7, 2015, 265 pages.

U.S. Appl. No. 12/057,652 downloaded Jan. 7, 2015, 296 pages.

U.S. Appl. No. 11/609,561 downloaded Jan. 7, 2015, 219 pages.

U.S. Appl. No. 11/356,920 downloaded Jan. 7, 2015, 272 pages.

(56) References Cited

OTHER PUBLICATIONS

U.S. Appl. No. 10/512,687 downloaded Jan. 7, 2015, Part 1 of 2; 300 pages.
U.S. Appl. No. 10/512,687 downloaded Jan. 7, 2015, Part 2 of 2; 254 pages.
U.S. Appl. No. 11/536,233 downloaded Jan. 7, 2015, 256 pages.
U.S. Appl. No. 11/536,215 downloaded Jan. 7, 2015, 172 pages.
U.S. Appl. No. 11/536,160 downloaded Jan. 7, 2015, 230 pages.
U.S. Appl. No. 11/964,168 downloaded Jan. 7, 2015, 222 pages.
U.S. Appl. No. 14/499,569 downloaded Jan. 7, 2015, 104 pages.
U.S. Appl. No. 14/499,569, filed Sep. 29, 2014, Golan et al.
Response to U.S. Office Action dated Dec. 16, 2016 corresponding to U.S. Appl. No. 14/499,569, filed Jan. 11, 2017; 18 pages.
U.S. Non-Final Office Action dated Dec. 16, 2016 corresponding to U.S. Appl. No. 14/499,569; 40 Pages.
U.S. Final Office Action dated Mar. 8, 2017 corresponding to U.S. Appl. No. 14/499,569; 53 Pages.
U.S. Non-Final Office Action dated Aug. 10, 2017 for U.S. Appl. No. 14/499,569; 15 Pages.
Notice of Allowance dated Nov. 30, 2017 for U.S. Appl. No. 14/499,569; 14 Pages.
Response to U.S. Non-Final Office Action dated Aug. 10, 2017 for U.S. Appl. No. 14/499,569, filed Nov. 8, 2017; 11 Pages.

\* cited by examiner

REALIGNING DATA IN REPLICATION SYSTEM

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes making a first active buffer a passive buffer, generating a second active buffer to receive new I/Os, making a list of locations that need realignment in the passive buffer, flushing open I/Os at a splitter, reading I/Os which need realignment; discarding re-aligned I/Os for overwritten areas and sending the passive buffer to a replica site.

In another aspect, an apparatus, includes electronic hardware circuitry configured to make a first active buffer a passive buffer, generate a second active buffer to receive new I/Os, make a list of locations that need realignment in the passive buffer, flush open I/Os at a splitter, read I/Os which need realignment, discard re-aligned I/Os for overwritten areas and send the passive buffer to a replica site.

An article includes a non-transitory computer-readable medium that stores computer-executable instructions. The instructions cause a machine to make a first active buffer a passive buffer, generate a second active buffer to receive new I/Os, make a list of locations that need realignment in the passive buffer, flush open I/Os at a splitter, read I/Os which need realignment, discard re-aligned I/Os for overwritten areas and send the passive buffer to a replica site.

DETAILED DESCRIPTION

Figure 1:
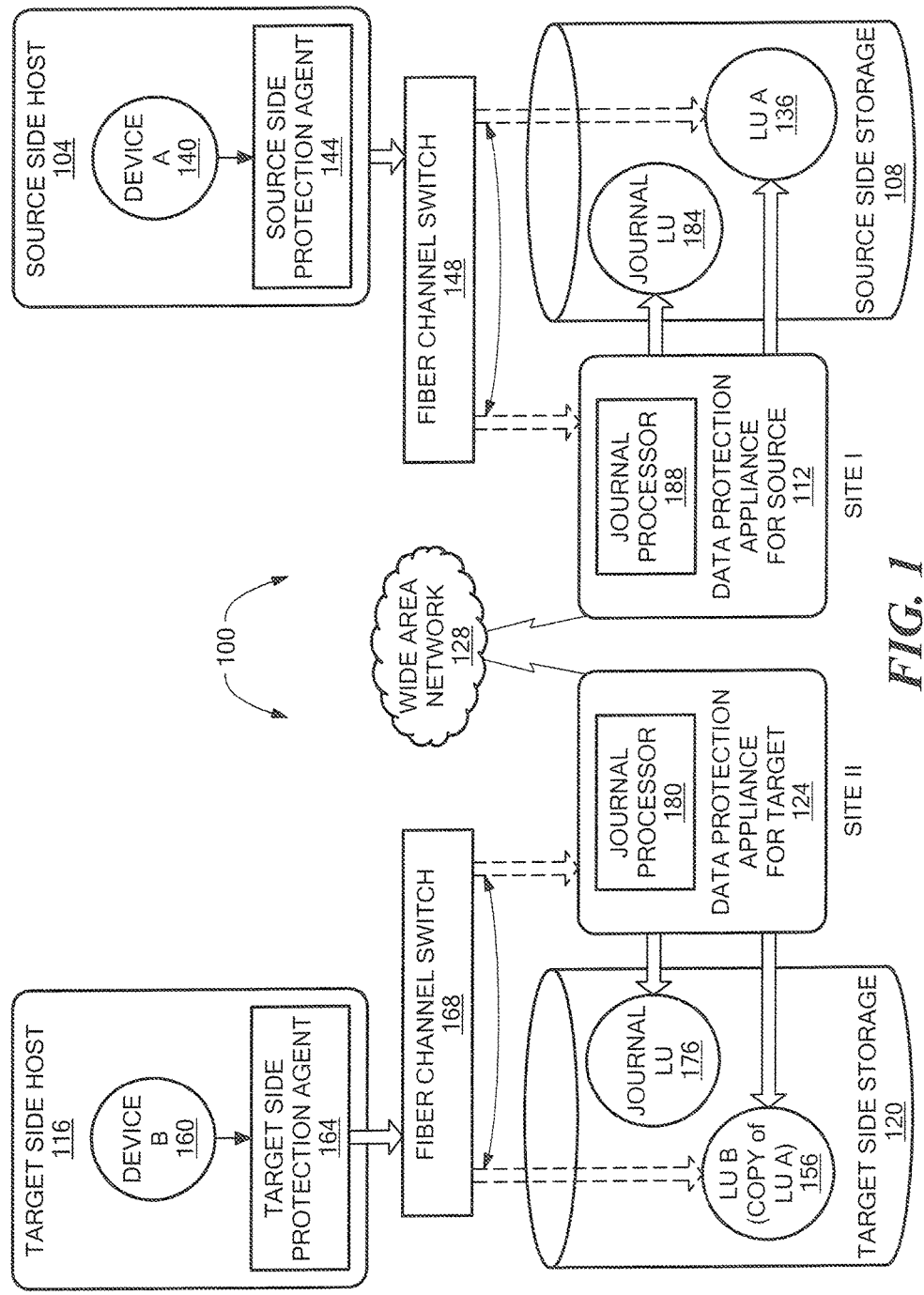
FIG. 1 is a block diagram of an example of a data protection system.

The following definitions may be useful in understanding the specification and claims.

BACKUP SITE—a facility where replicated production site data is stored; the backup site may be located in a remote site or at the same location as the production site; a backup site may be a virtual or physical site.

BOOKMARK—a bookmark is metadata information stored in a replication journal which indicates a point in time.

CDP—Continuous Data Protection, a full replica of a volume or a set of volumes along with a journal which allows any point in time access, the CDP copy is at the same site, and maybe the same storage array of the production site.

DATA PROTECTION APPLIANCE (DPA)—a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

DEDUPLICATED STORAGE SYSTEM—any storage system capable of storing deduplicated or space reduced data, and in some examples, is an EMC® DataDomain® system. Deduplicated data may also be any data that is processed to remove redundant data.

HOST—at least one computer or networks of computers that runs at least one data processing application that issues I/O requests to one or more storage systems; a host is an initiator with a SAN.

HOST DEVICE—an internal interface in a host, to a logical storage unit.

IMAGE—a copy of a logical storage unit at a specific point in time.

INITIATOR—a node in a SAN that issues I/O requests.

I/O REQUEST—an input/output request (sometimes referred to as an I/O or IO), which may be a read I/O request (sometimes referred to as a read request or a read) or a write I/O request (sometimes referred to as a write request or a write).

JOURNAL—a record of write transactions issued to a storage system; used to maintain a duplicate storage system, and to roll back the duplicate storage system to a previous point in time.

LOGICAL UNIT—a logical entity provided by a storage system for accessing data from the storage system. The logical disk may be a physical logical unit or a virtual logical unit.

LUN—a logical unit number for identifying a logical unit.

PHYSICAL LOGICAL UNIT—a physical entity, such as a disk or an array of disks, for storing data in storage locations that can be accessed by address.

PRODUCTION SITE—a facility where one or more host computers run data processing applications that write data to a storage system and read data from the storage system.

REMOTE ACKNOWLEDGEMENTS—an acknowledgement from remote DPA to the local DPA that data arrived at the remote DPA (either to the appliance or the journal).

SNAPSHOT—a snapshot is an image or differential representations of an image, i.e., the snapshot may have pointers to the original volume, and may point to log volumes for changed locations. Snapshots may be combined into a snapshot array, which may represent different images over a time period.

SPLITTER/PROTECTION AGENT—is an agent running either on a production host a switch or a storage array which can intercept I/Os and split them to a DPA and to the storage array, fail I/Os, redirect I/Os or do any other manipulation to the I/O; the splitter or protection agent may be used in both physical and virtual systems. The splitter may be in the I/O stack of a system and may be located in the hypervisor for virtual machines. In some examples, a splitter may be referred to as an Open Replicator Splitter (ORS).

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target.

SOURCE SIDE—a transmitter of data within a data replication workflow, during normal operation a production site is the source side; and during data recovery a backup site is the source side, sometimes called a primary side. Source side may be a virtual or physical site.

STORAGE SYSTEM—a SAN entity that provides multiple logical units for access by multiple SAN initiators.

STREAMING—transmitting data in real time, from a source to a destination, as the data is read or generated.

SYNTHESIZE—generating a new file, for example, using pointers from existing files, without actually copying the referenced data. In one particular example, a new file representing a volume at a points-in-time may be generated using pointers to a file representing a previous point-in-time, as well pointers to journal representing changes to the volume.

TARGET—a node in a SAN that replies to I/O requests.

TARGET SIDE—a receiver of data within a data replication workflow; during normal operation a back site is the target side, and during data recovery a production site is the target side, sometimes called a secondary side. The target side may be a virtual or physical site.

THIN PROVISIONING—thin provisioning involves the allocation of physical storage when it is needed rather than allocating the entire physical storage in the beginning. Thus, use of thin provisioning is known to improve storage utilization.

THIN LOGICAL UNIT—a thin logical unit is a logical unit that uses thin provisioning.

VIRTUAL LOGICAL UNIT—a virtual storage entity which is treated as a logical unit by virtual machines.

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS generates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one example, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer generates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B, updates the journal entries in the journal LU with undo information, applies the journal transactions to LU B, and removes already-applied transactions from the journal.

Figure 2:
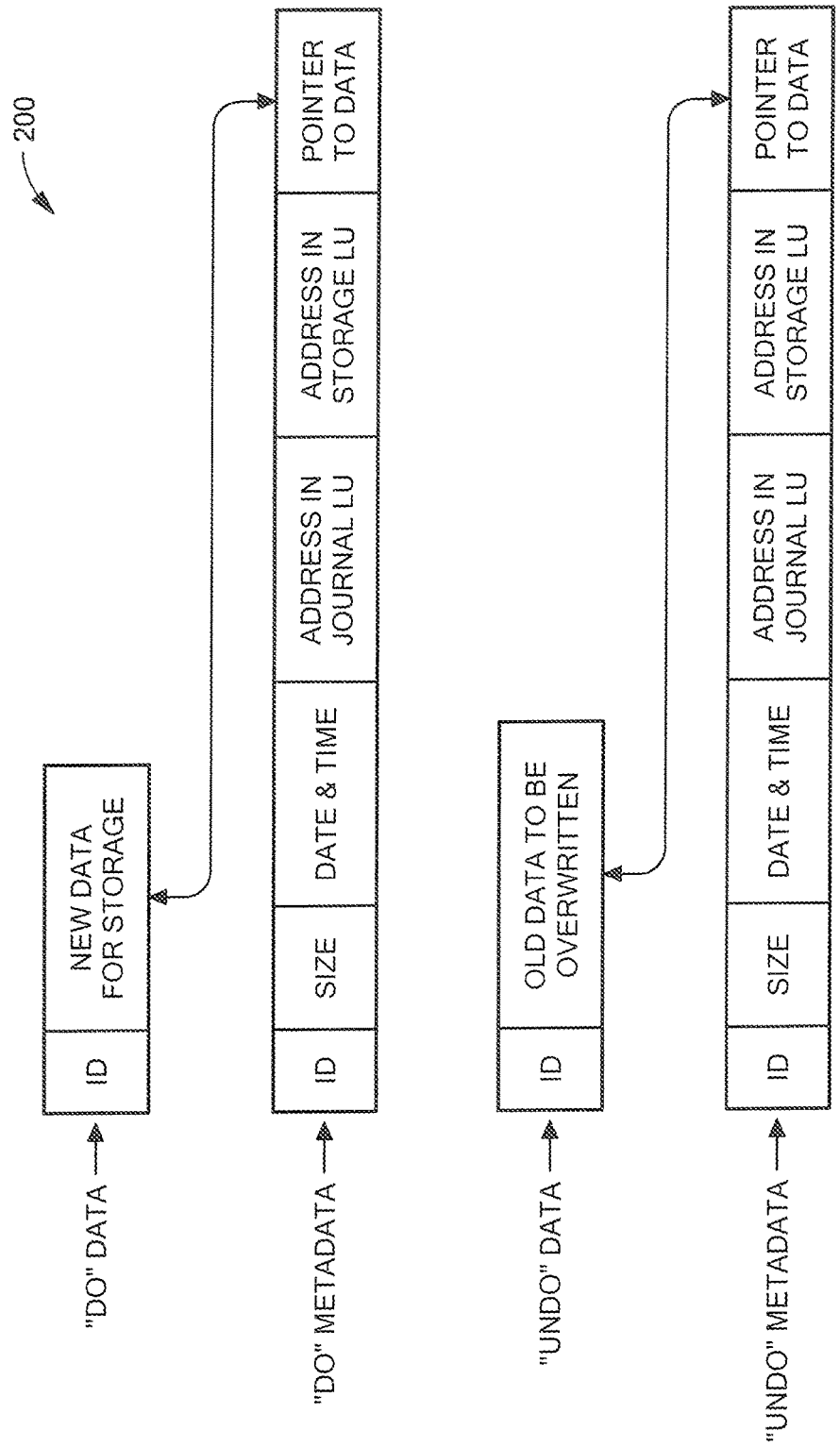
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal includes the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
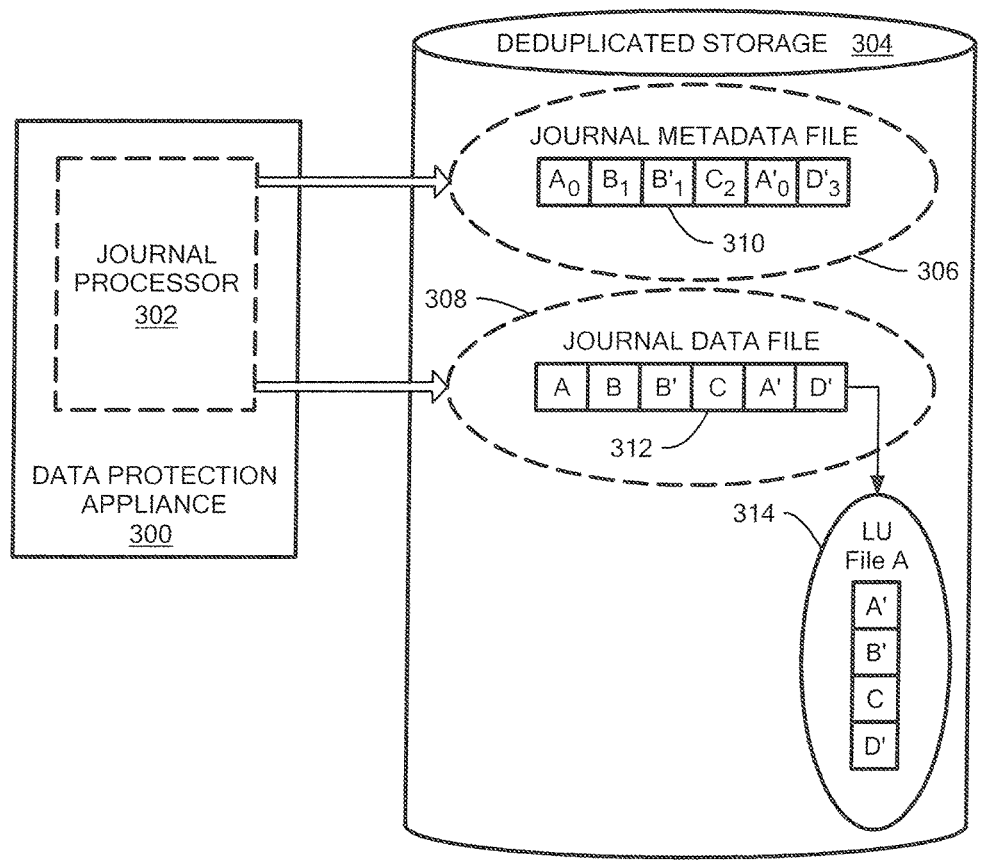
FIG. 3 is a block diagram of an example of a system to initialize a backup snapshot.

FIG. 3 depicts a system for generating an initial backup snapshot by scanning a source storage system and streaming I/Os to a deduplicated storage. Data protection application 300 may include journal processor 302, and may be in communication with deduplicated storage 304. In one example, deduplicated storage 304 may be target side storage residing at a backup site. Data protection appliance 300 may be similar to data protection appliance 112 and/or 124, and may be responsible for streaming I/Os to deduplicated storage 304.

In one example, a source storage system may be scanned and individual offsets may be streamed to data protection appliance 300. The offsets streamed from the scanned system may be referred to as initialization I/Os, and may be streamed sequentially to data protection appliance 300. For example, the scanned system may include offsets 0, 1, 2, and 3, comprising data A, B, C, and D. The initial scan may start at the beginning of the system, and transmit offset 0, followed by offset 1, and so forth.

As data protection appliance 300 receives the initialization I/Os, journal processor 302 may identify the offset data and metadata, and may stream the I/Os to metadata journal 306 and/or data journal 308 residing on deduplicated storage 304. Data journal 308 may include data stored within an offset, and metadata 306 may include metadata associated with that offset. Metadata could include, for example, an offset identifier, size, write time, and device ID. These journals may then be used to synthesize a backup snapshot on deduplicated storage 304, as described herein.

In some examples, a scanned storage system may operate in a live environment. As a result, applications may be writing to the storage concurrently with the scan process. If an application writes to a location that has already been streamed, the journal files and ultimately the synthesized snapshot may be out of date. To address this issue, application I/Os may be streamed concurrently with the initialization I/Os if the application I/Os are to an offset that has already been scanned. For example, consider Table 1:

| Offset/Time | t0 | t1 | t2 | t3 |
|---|---|---|---|---|
| 0 | A | | | A' |
| 1 | B | B' | | |
| 2 | C | | | |
| 3 | D | | D' | |

Table 1 depicts four different offsets, denoted as 0, 1, 2, and 3, and four times, t0, t1, t2, and t3. Letters A, B, C, and D may represent the data stored at the offsets. Time t0 may represent the offsets as they exist when the scan begins. These offsets may be streamed to data protection appliance 300 sequentially from 0 to 3. At time t1, however, the data at offset 1 is modified by an application from B to B'. Similarly, at t2 the data at offset 3 changes from D to D', and at t3 the data at offset 0 changes from A to A'. If the scan transmits the data at offset 1 before t1, B' may be missed since the change occurred after offset 1 was scanned and B was transmitted. Similarly, if the scan has not reached offset 3 before t2, only D' will be transmitted since D no longer exists. It may therefore be beneficial to transmit application I/Os to data protection appliance 300 if those I/Os write to an offset that has already been scanned. If the offset has not been scanned, it may not be necessary to transmit the application I/Os because the change will be transmitted when the scan reaches that offset.

Referring back to FIG. 3 and with continued reference to Table 1, offset metadata journal entries 310 and offset data journal entries 312 depict the state of metadata journal 306 and data journal 308 after the initial scan is complete. While there are only four offsets on the scanned storage system, there are six entries in the journal because the data in offset 0 and 1 was modified by an application after they were scanned. They each therefore have two entries: B and B'. Segment D was modified after the scan began, but before it was reached. Segment D therefore only has one entry: D'.

Metadata journal entries 310 and data journal entries 312 may include all of the data necessary to synthesize a backup snapshot of the scanned storage system. Data journal entries 312 may include the actual data from the storage system: A, B, B' C, A' and D'. Note that data D is not in the data journal 308 since it was modified on the storage system before its offset was scanned and transmitted. Metadata journal entries 310 may include metadata about the offsets. For example, metadata journal entries 310 may include an offset identifier, offset length, and write time, and volume/device ID. In the present example, metadata journal entries may include the entries shown in Table 2:

| Offset/Time | Volume | Offset | Time |
|---|---|---|---|
| 0 | A | 0 | t0 |
| 1 | A | 8 kb | t0 |
| 2 | A | 8 kb | t1 |
| 3 | A | 16 kb | t0 |
| 4 | A | 0 | t3 |
| 5 | A | 24 kb | t2 |

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use metadata journal 306 and data journal 308 to synthesize initial backup snapshot 314. First, metadata journal 306 may be queried to identify the most recent data associated with each offset. Next, the data may be retrieved from journal data file 308 and synthesized into backup snapshot 314. In some examples, synthesizing the backup snapshot may include generating and/or copying pointers rather than copying entire data blocks. This could be, for example, using a product such as EMC® DataDomain® Boost™

For example, once the initial scan is complete, data journal 308 includes data A, B, B', C, A', and D'. A' and B' are the result of application I/Os occurring during the scan process, and therefore represent the present state of offsets 0 and 1. To generate backup snapshot 314, deduplicated storage may therefore retrieve A', B', C, and D' from the data journal 308 and synthesize them together.

Once initial backup snapshot 314 is synthesized, journal entries 310 and 312 may no longer be needed. In some examples, they may be removed from deduplicated storage 304 in order to conserve space. Alternatively, they may remain in the journals.

The systems and processes described in reference to FIG. 3 enable a system to generate an initial backup snapshot. Once the initial snapshot is generated, additional processes may enable continuous data protection and point-in-time recovery.

Figure 4:
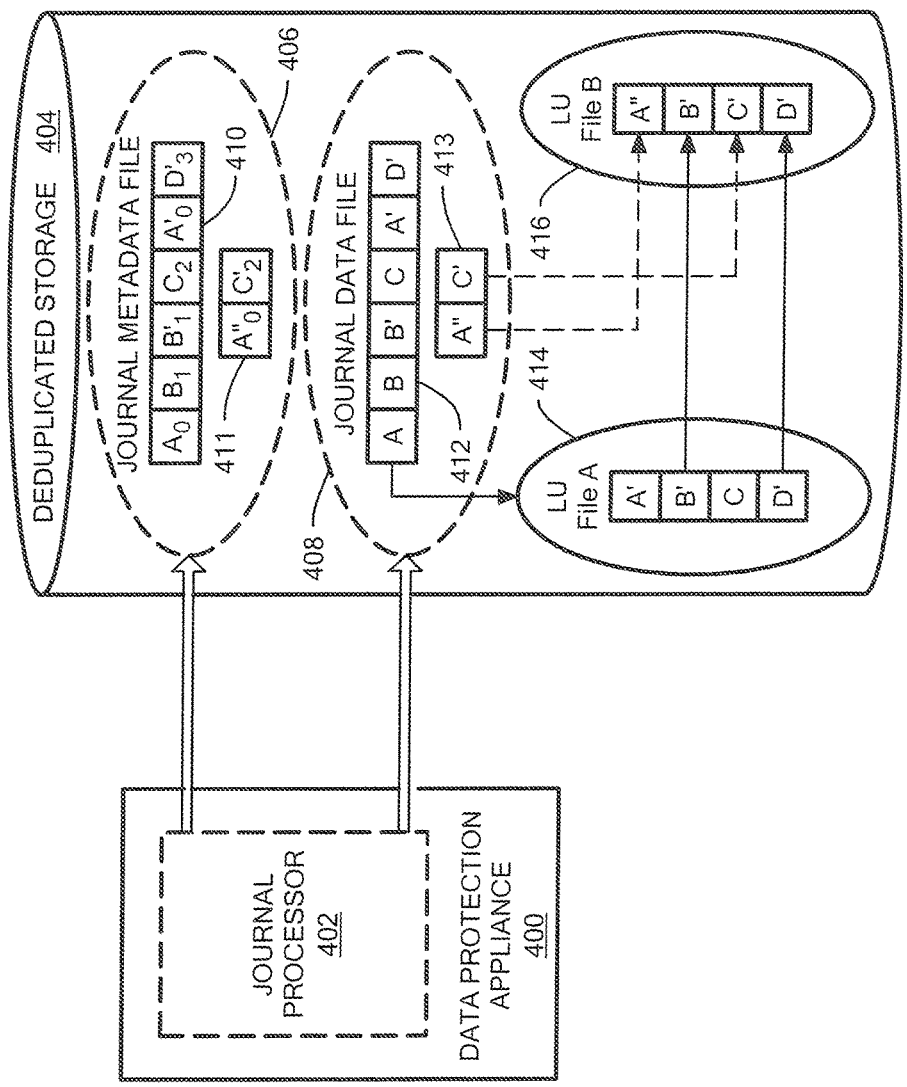
FIG. 4 is a system to synthesize new backup snapshots.

Referring to FIG. 4, a system and process for maintaining backups using continuous data replication is described. As datasets increase in size, backing them up to remote or local backup devices becomes increasingly costly and complex. Additionally, traditional backup processes may not allow point-in-time recovery since the backups occur on a periodic, rather than continuous, basis. The methods and systems described herein provide continuous backup protection as writes are made to a source device, thereby reducing backup cost and complexity, and may allowing point-in-time recovery for backed up files.

The system of FIG. 4 includes data protection appliance 400, journal processor 402, and deduplicated storage 404. These elements may be substantially similar to those described in reference to FIG. 3. Deduplicated storage 404 may include backup snapshot 414, metadata journal file 406, and data journal file 408. In an embodiment, backup snapshot file 414 is synthesized in a manner substantially similar to backup snapshot 314, and may be generated using metadata journal entries 410 and data journal entries 412.

As users, applications, and other processes access and use the source storage system, data on that system may change and/or new data may be generated. As a result, initial backup snapshot 414 may become stale. If the source storage system should fail, there is a chance that any new or modified data may be lost. To address this concern, data protection appliance 400 may receive and stream application I/Os to deduplicated storage system 404 on a continuous basis, even after initial backup snapshot 414 is synthesized. Streaming the application I/Os allows the backups on deduplicated storage 404 to remain up-to-date, without needing to perform additional backups of large datasets. This may reduce network traffic, reduce workloads, and conserve space on deduplicated storage 404.

For example, new metadata entries 411 and new data journal entries 413 represent I/Os made after initial backup snapshot 414 was synthesized. These entries may be written to metadata journal 406 and data journal 408, as shown in FIG. 4, or they may be written to separate journal files. In FIG. 4, data A' and C were modified on the source storage device, and the journal entries therefore comprise A" and C'.

Periodically, new backup snapshots may be synthesized from a previous backup snapshot and new journal entries. For example, second backup snapshot 416 may be synthesized from initial backup snapshot 414, new metadata journal entries 411, and new data journal entries 413. Second backup snapshot 416 may be used to restore source storage system up to the point-in-time the last journal entry was received. In other words, backup snapshot 416 represents a backup of the source storage system at a later timestamp than initial backup snapshot 414.

In one example synthesizing second backup journal entry 416 may be substantially similar to synthesizing the initial backup snapshot 414. Rather than synthesizing all of the data from data journal 408, however, unchanged data may be synthesized from initial backup snapshot 414. In an embodiment, this synthesis may comprise copying and/or generating a data pointer. For example, in FIG. 4 the solid arrows between initial backup snapshot 414 and second backup snapshot 416 represent unchanged data that is common between the two. In this case, only B' and D' remain unchanged. The dashed arrows represent new or changed data that needs to be synthesized into second backup snapshot 416. In FIG. 4, A' is changed to A", C is change to C'. Synthesizing the data into second backup snapshot 616 therefore results in A", B', C', D'.

Additionally or alternatively, second backup snapshot 416 may be synthesized entirely from journal entries. Rather than synthesizing unchanged data from initial backup 414, deduplicated storage 404 may retrieve the unchanged data from data journal entries 412. For example, B' and D' may be synthesized from data journal entries 412 rather than from initial backup snapshot 414.

Additional backup snapshots, such as second backup snapshot 416, may be generated periodically or on demand. For example, a user policy may specify that new snapshots should be generated every week. Additionally or alternatively, a user may be preparing to perform some risky operations on the source storage system, and may demand that a snapshot be generated in case something goes wrong. These policies may be maintained and applied using data protection appliance 400, deduplicated storage 404, and/or an external system.

The system and processes described herein may enable additional backup snapshots to be synthesized from journal entries and existing snapshots. In some embodiments, the journal entries may be application I/Os which are continuously streamed to a data protection appliance. While these snapshots may provide additional data protection, they may only allow data that exists in the snapshots to be recovered. Combining snapshots and journal files may, however, allow any point-in-time recovery.

As described in the preceding paragraphs and related applications, continuously streaming I/Os to a data protection system may provide numerous performance and/or data protection benefits. These I/Os may be used to synthesize backup snapshots on the deduplicated storage, which may then be used for data recovery. The performance benefits may be lessened, however, if the I/Os are not properly aligned with the blocks on the deduplicated storage. Unaligned I/Os may cause data moves during the synthesis process rather than mere pointer manipulation. Further, if I/Os are unaligned early in a journal file they may have a cascading effect on subsequent I/Os. The systems and processes described herein allow a system to align I/Os with the deduplicated block sizes.

Synthesis processes, as described at least in reference to FIG. 4, allow backup snapshots to be generated with little or no data movement. Reducing data movement is desirable as it may decrease the likelihood of duplication, thereby conserving space, and reduce processing time. Rather than moving data, synthesis processes attempt to generate pointers to the data as it exists within other files on the system. If a pointer cannot be generated for the data, the data must be read from the location where it already exists and written to the new file being synthesized. This results in two I/O operations, a read and a write, which would otherwise be unnecessary.

Unaligned I/Os increase the probability of data movement during the synthesis process. Pointers must themselves be aligned, which means they can only point to an offset which is a multiple of a data block size, where the data length is also a multiple of the block size. They cannot, for example, point to a location in the middle of the data block. Therefore, if an I/O has an offset and/or a data length that is not aligned (i.e. a multiple of) a data block size, the synthesis process cannot generate a pointer for that I/O and a data move may be necessary.

For example, a deduplicated storage system may have a basic block size of 8 kb. Pointers may therefore be generated for any data with an offset and length that is a multiple of 8 kb (e.g., offset 24 kb; length 64 kb). Suppose an I/O arrives, however, which has a length of 2 kb. No matter where this I/O is written, a pointer cannot be used because the I/O length is not a multiple of a block size. As a result, a synthesis process involving that I/O would need to read and write the 2 kb of data, resulting in two I/O operations rather than mere pointer manipulation.

Similarly, if an I/O arrives with an offset of 2 kb and a length of 8 kb, the synthesis process cannot use pointer manipulation since the offset is not a multiple of the block size. As a result, the 8 kb must be read and written to a new location during the synthesis process.

Finally, suppose an I/O arrives with an offset of 2 kb and a size of 24 kb. This I/O may span four separate data blocks. The first 6 kb of the I/O would need to be read/written during the synthesis process since it starts at 2 kb and has a length of 6 kb, neither of which is a multiple of the 8 kb block size. Similarly, the last 2 kb would need to be read/written since 2 kb is not a multiple of the block size. The middle 16 kb, however, may be synthesized using pointer manipulation. This portion of the I/O may start at offset 8 kb (since the first portion started at 2 kb and has a length of 6 kb), and has a total length of 16 kb. Both the offset and the length are multiple of the block size, and therefore do not need to be read or written. As a result, synthesizing a file using this I/O would involve both pointer manipulation and I/O operations.

Since I/Os are journaled sequentially, the misalignment of a single I/O may have a cascading effect on the rest of the journal. A misaligned I/O at the start of a journal file may impact all the subsequent I/Os in the journal, even if they would otherwise be aligned. Suppose, for example, the following I/Os arrive at a data protection appliance:
 0. offset=8 kb; size=16 kb
 1. offset=2 kb; size=2 kb
 2. offset=24 kb; size=64 kb Further suppose these offsets are sequentially journaled in a data journal on deduplicated storage as follows:
 0. offset=0 kb; size=16 kb
 1. offset=16 kb; size=2 kb
 2. offset=18 kb; size=64 kb Note that offsets in the data journal are those for the deduplicated storage. The offsets that arrived from the primary storage system (i.e. 8 kb, 2 kb, and 24 kb) are stored in the metadata journal.

Figure 5:
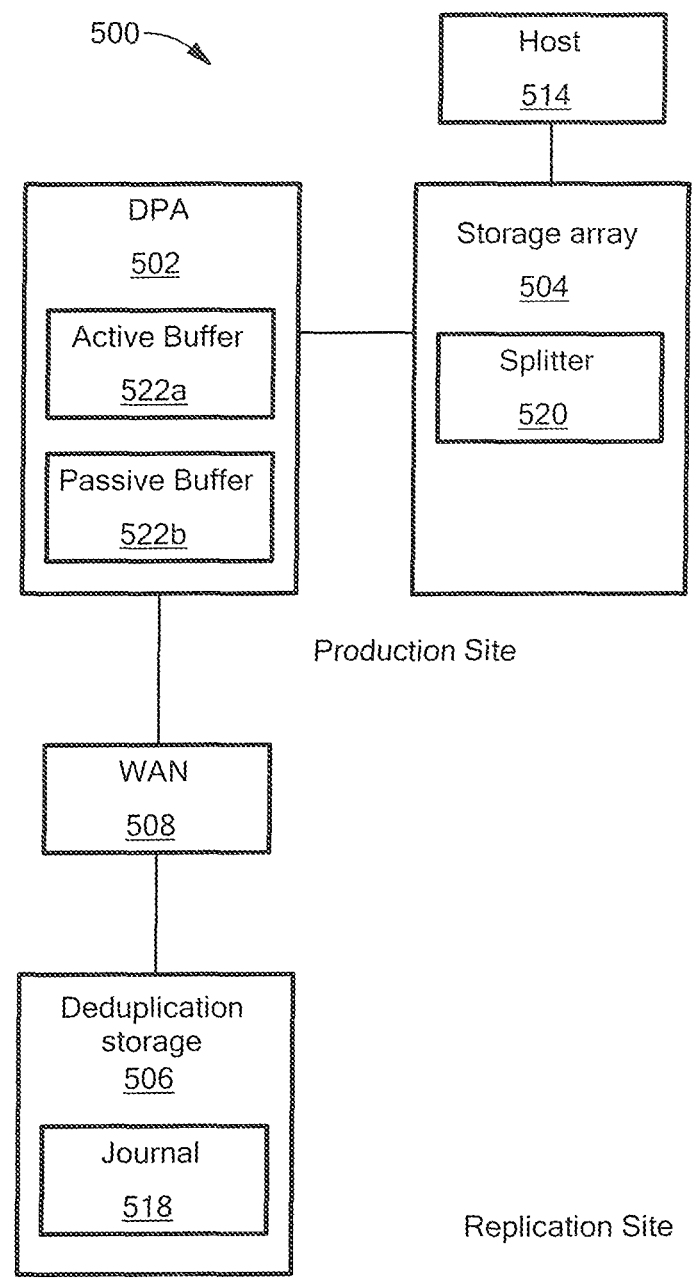
FIG. 5 is a block diagram of a system that aligns data.

In the above example, the only I/O that is properly aligned in the journal is the one at offset 0 kb (still assuming a block size of 8 kb). The I/O at offset 16 kb is not properly aligned since its length is only 2 kb. Further, the I/O at offset 16 kb misaligns the next I/O, which starts at offset 18 kb. As a result, any synthesis operations involving these three I/Os will require data movement Referring to FIG. 5, a replication system 500 includes a DPA 502, a storage array 504 connected to a deduplication storage 506 over a WAN 508 and a host 514 connected to the storage array 504. The storage array 504 includes a splitter 520. The deduplication storage 506 includes a journal 518. The DPA 502 includes an active buffer 522a which receives new I/Os and a passive buffer 522b, which includes I/Os being re-aligned. The active buffer 522a and the passive buffer 522b are used to align I/Os coming from the splitter 520 for the deduplication storage 506.

Figure 6:
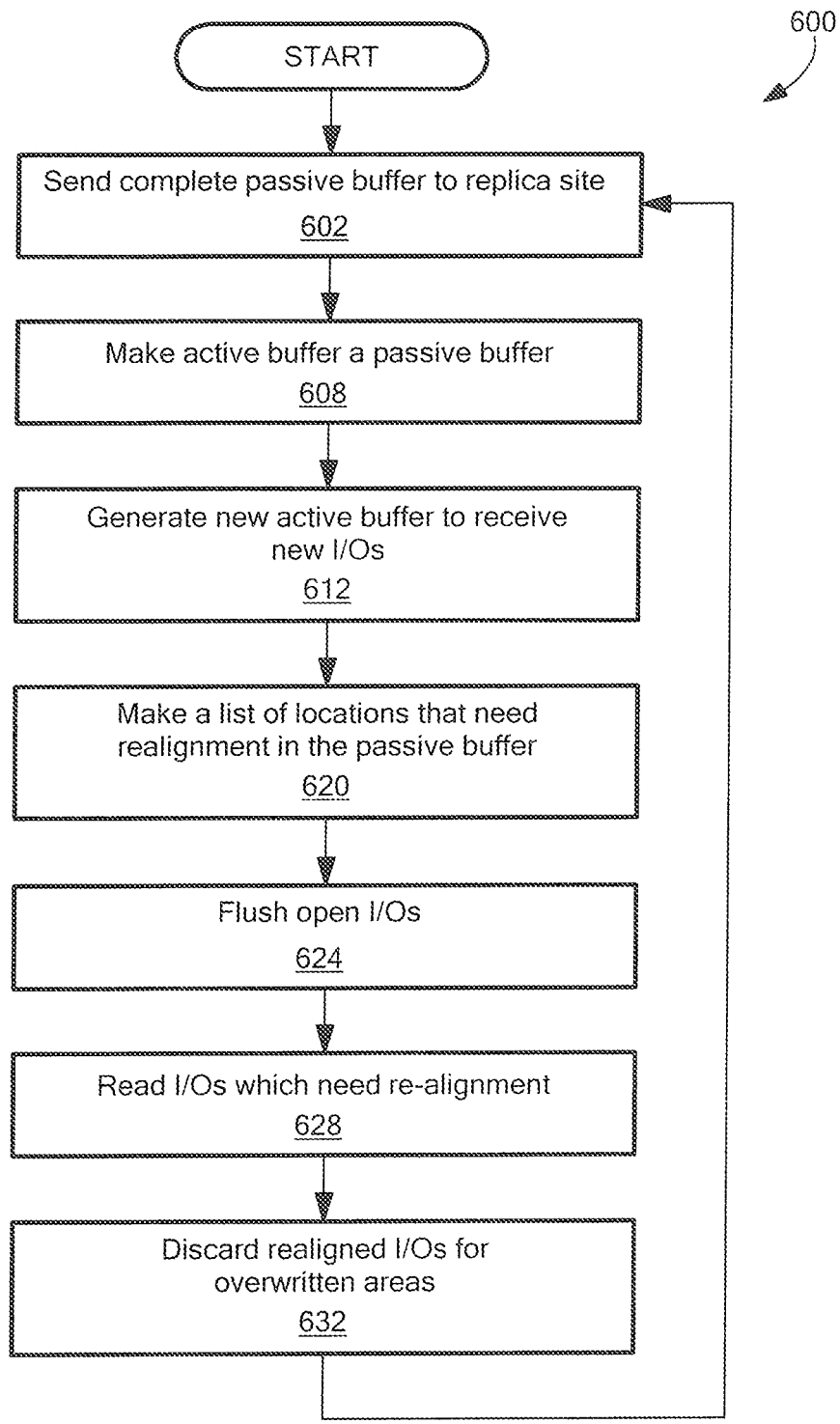
FIG. 6 is a flowchart of an example of a process to align data.

Referring to FIG. 6, an example of a process to align data is a process 600.

Process 600 sends a complete passive buffer to the replica site (602). A complete passive buffer is a passive buffer where the I/Os were re-aligned except I/Os which may have been overwritten. The complete passive buffer is sent to the journal 518 in the deduplication storage 506.

Process 600 makes the active buffer a passive buffer (608) and generates a new active buffer to receive new I/Os (612).

Process 600 makes a list of locations that need realignment in the passive buffer 522b (620). For example, the list of locations is a list of locations that need re-alignment in the passive buffer 522b after write folding and joining of sequential I/Os. Write folding means that if there are I/Os to the same location only the latest I/O is kept in the passive buffer 522b. Joining sequential I/Os means that if there are two I/Os, one starting at offset x of length l1 and the other starts at x+l1 and length l2, they will be joined as one I/O with length l1+l2 starting at x. If I/Os are sequential, then joining the sequential I/Os may form aligned I/Os.

Process 600 flushes open I/Os (624). For example, the splitter 520 flushes the open I/Os. For example, open I/Os include I/Os that have not completed their respective write request.

Process 600 reads I/Os which need realignment (628). For example, the aligned I/Os are read from the production storage (e.g., storage array 504) using the locations determined in processing block 620 (i.e., if an I/O is not aligned, the minimum sized I/O containing the I/O which is aligned is read from the storage array).

Process 600 discards re-aligned I/Os for overwritten areas (632). For example, re-aligned I/Os are discarded which intersect with an I/O in the active buffer 522a. For example, if there are 8 kb aligned that is read and there is an I/O intersecting this 8 kb, then the 8 kb is discarded from the re-alignment.

After processing block 632, the passive buffer 522b is now complete because it includes I/Os that were re-aligned (except I/Os which may have been overwritten) and process 600 is repeated starting at processing block 602.

Figure 7:
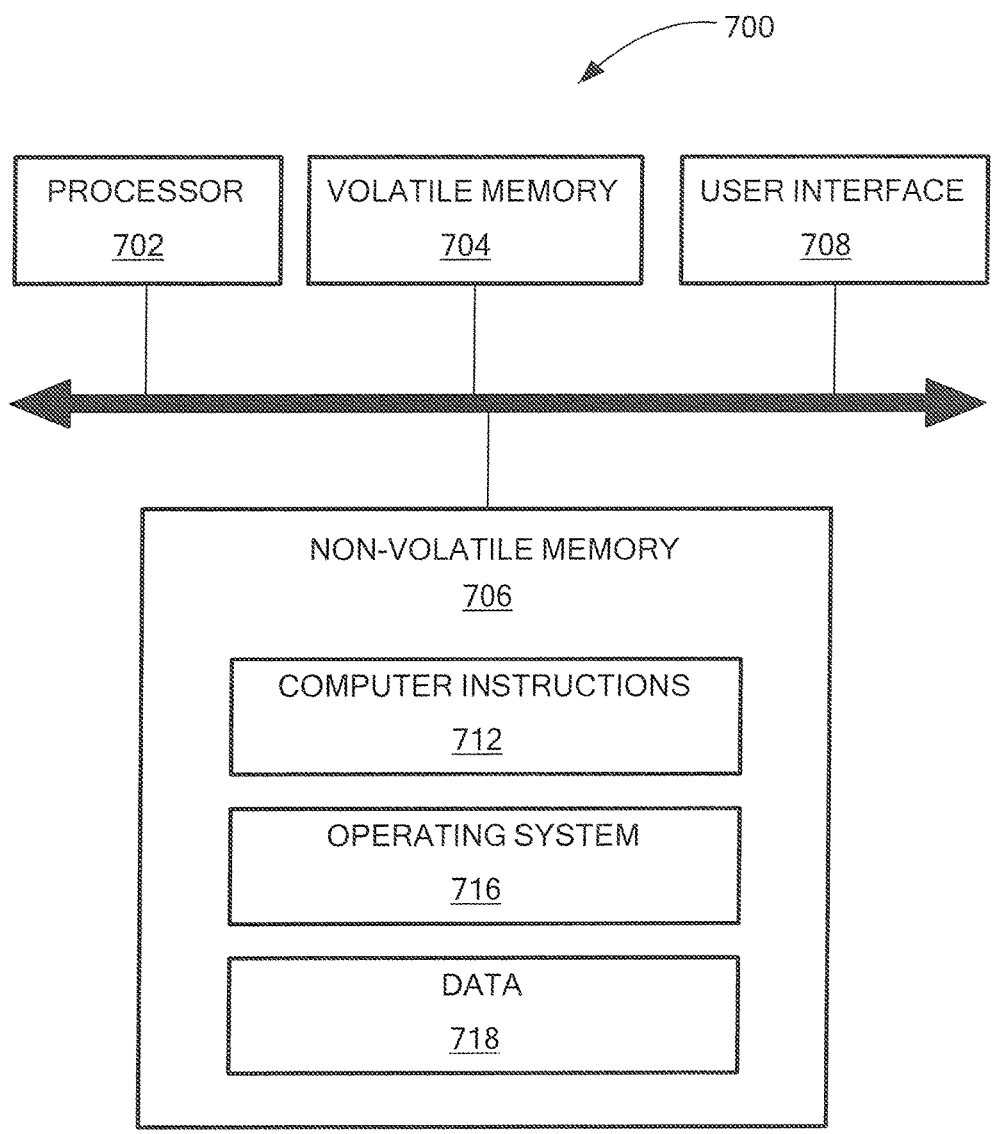
FIG. 7 is a simplified block diagram of an example of a computer on which any of the process of FIG. 6 may be implemented.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., process 600).

In one particular example, an active buffer is opened and receives the following I/Os (alignment is 8 kb):
 1. Offset 8 kb, size 2 kb
 2. Offset 24 kb size 8 kb
 3. Offset 10 kb size 6 kb
 4. Offset 66 kb size 4 kb
 5. Offset 65 kb size 4 kb
 6. Offset 74 kb size 4

The active buffer become a passive buffer and a new active buffer is formed. The passive buffer gets write folding and joining I/Os. In particular, I/O 1 and I/O 3 are joined as one I/O offset 8 KB and size 8 KB (which is now aligned), I/O 4 and I/O 5 are joined as one I/O offset 65 KB size SKB (which is not aligned), and I/O 6 is also not aligned.

The realignment process (e.g., process 600) will read from offset 64 size 16 kb since alignment is needed both from 64 KB to 72 KB and from 72 KB to 80 KB.

During the realignment process, new I/Os are intercepted. For example, The following new I/O arrives to the new active buffer:
 1. Offset 800 kb size 8 kb
 2. Offset 73 size 3.

Thus what was read from offset 72 kb to offset 80 KB is discarded since the data was overwritten. Now the passive buffer will have the following I/Os:
 1. Offset 8 KB size 8 KB
 2. Offset 24 KB size 8 KB
 3. Offset 64 KB size 8 KB
 4. Offset 74 KB size 4 KB (this I/O was not re-aligned successfully since it was overwritten),
and the passive data buffer is send to the deduplicated storage.

The processes described herein (e.g., process 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 600 is not limited to the specific processing order of FIG. 6. Rather, any of the processing blocks of FIG. 6 may be re-ordered, combined or removed, performed in parallel or in serial, as necessary, to achieve the results set forth above.

The processing blocks (for example, in the process 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   making a first active buffer stored on a first data protection appliance (DPA) a passive buffer;
   generating a second active buffer on the first DPA to receive new I/Os;
   making a list of locations that need realignment in the passive buffer, wherein making the list of locations that need realignment in the passive buffer comprises making a list of locations after write folding and joining of sequential I/Os, the locations that need realignment have an offset or a data length that is not a multiple of a data block size;
   flushing open I/Os at a splitter, the splitter being stored on a storage array, the splitter being configured to intercept I/Os and split the intercepted I/Os to the first DPA and to the storage array, an intercepted I/O is written to the storage array after receipt, by the splitter, of an acknowledgment from a second DPA at a replica site that the intercepted I/O was received at the second DPA, the open I/Os comprising I/Os that have not been written to the storage array because a corresponding acknowledgment was not received;
   reading I/Os from the storage array which need realignment using the list of locations;
   discarding re-aligned I/Os for overwritten areas; and
   sending the passive buffer to the replica site.

2. The method of claim 1, wherein sending the passive buffer to the replica site comprises sending re-aligned I/Os except I/Os which have been overwritten.

3. The method of claim 1, wherein discarding re-aligned I/Os for overwritten areas comprises discarding re-aligned I/Os intersecting with an I/O in the second active buffer.

4. The method of claim 1, wherein reading I/Os which need realignment comprises reading I/Os which need realignment from a storage array using list of locations that need realignment in the passive buffer.

5. The method of claim 1, wherein sending the passive buffer to the replica site comprises sending the passive buffer to a journal stored on a deduplication storage.

6. The method of claim 1, wherein sending the passive buffer to the replica site comprises sending re-aligned I/Os except I/Os which have been overwritten,
   wherein making the list of locations that need realignment in the passive buffer comprises making a list of locations after write folding and joining of sequential I/Os.

7. An apparatus, comprising:
   electronic hardware circuitry configured to:
      making a first active buffer stored on a first data protection appliance (DPA) a passive buffer;
      generating a second active buffer on the first DPA to receive new I/Os;
      making a list of locations that need realignment in the passive buffer, wherein making the list of locations that need realignment in the passive buffer comprises making a list of locations after write folding and joining of sequential I/Os, the locations that need realignment have an offset or a data length that is not a multiple of a data block size;

flushing open I/Os at a splitter, the splitter being stored on a storage array, the splitter being configured to intercept I/Os and split the intercepted I/Os to the first DPA and to the storage array, an intercepted I/O is written to the storage array after receipt, by the splitter, of an acknowledgment from a second DPA at a replica site that the intercepted I/O was received at the second DPA, the open I/Os comprising I/Os that have not been written to the storage array because a corresponding acknowledgment was not received;

reading I/Os from the storage array which need realignment using the list of locations;

discarding re-aligned I/Os for overwritten areas; and sending the passive buffer to the replica site.

8. The apparatus of claim 7, wherein the circuitry comprises at least one of a processor, a memory, a programmable logic device or a logic gate.

9. The apparatus of claim 7, wherein the circuitry configured to send the passive buffer to the replica site comprises circuitry configured to send re-aligned I/Os except I/Os which have been overwritten.

10. The apparatus of claim 7, wherein the circuitry configured to discard re-aligned I/Os for overwritten areas comprises circuitry configured to discard re-aligned I/Os intersecting with an I/O in the second active buffer.

11. The apparatus of claim 7, further comprising circuitry configured to read I/Os which need realignment from a storage array using a list of locations that need realignment in the passive buffer.

12. The apparatus of claim 7, wherein the circuitry configured to send the passive buffer to the replica site comprises circuitry configured to send the passive buffer to a journal in a deduplication storage.

13. An article comprising:

a non-transitory computer-readable medium that stores computer-executable instructions, the instructions causing a machine to:

making a first active buffer stored on a first data protection appliance (DPA) a passive buffer;

generating a second active buffer on the first DPA to receive new I/Os;

making a list of locations that need realignment in the passive buffer, wherein making the list of locations that need realignment in the passive buffer comprises making a list of locations after write folding and joining of sequential I/Os, the locations that need realignment have an offset or a data length that is not a multiple of a data block size;

flushing open I/Os at a splitter, the splitter being stored on a storage array, the splitter being configured to intercept I/Os and split the intercepted I/Os to the first DPA and to the storage array, an intercepted I/O is written to the storage array after receipt, by the splitter, of an acknowledgment from a second DPA at a replica site that the intercepted I/O was received at the second DPA, the open I/Os comprising I/Os that have not been written to the storage array because a corresponding acknowledgment was not received;

reading I/Os from the storage array which need realignment using the list of locations;

discarding re-aligned I/Os for overwritten areas; and sending the passive buffer to the replica site.

14. The article of claim 13, wherein the instructions causing the machine to send the passive buffer to the replica site comprises instructions causing the machine to send re-aligned I/Os except I/Os which have been overwritten.

15. The article of claim 13, wherein the instructions causing the machine to discard re-aligned I/Os for overwritten areas comprises instructions causing the machine to discard re-aligned I/Os intersecting with an I/O in the second active buffer.

16. The article of claim 13 further comprising instructions causing the machine to read I/Os which need realignment comprises reading I/Os which need realignment from a storage array using list of locations that need realignment in the passive buffer.

17. The article of claim 13, wherein the instructions causing the machine to send the passive buffer to the replica site comprises instructions causing the machine to send the passive buffer to a journal in a deduplication storage.

* * * * *